United States Patent
Brambilla et al.

(10) Patent No.: US 12,512,756 B2
(45) Date of Patent: Dec. 30, 2025

(54) CONSTANT ON-TIME POWER CONVERTER WITH ADJUSTABLE PULSE DURATION AND SOFT-START CONTROL

(71) Applicant: STMicroelectronics International N.V., Geneva (CH)

(72) Inventors: Niccolò Brambilla, San Donato Milanese (IT); Stefano Corona, Borgarello (IT); Valeria Bottarel, Novara (IT); Alessandro Saccà, Milan (IT)

(73) Assignee: STMicroelectronics International N.V., Geneva (CH)

( * ) Notice: Subject to any disclaimer, the term of this patent is extended or adjusted under 35 U.S.C. 154(b) by 258 days.

(21) Appl. No.: 18/344,340

(22) Filed: Jun. 29, 2023

(65) Prior Publication Data
US 2025/0007403 A1    Jan. 2, 2025

(51) Int. Cl.
*H02M 3/158* (2006.01)
*H02M 1/08* (2006.01)
*H02M 1/36* (2007.01)

(52) U.S. Cl.
CPC .............. *H02M 3/158* (2013.01); *H02M 1/08* (2013.01); *H02M 1/36* (2013.01)

(58) Field of Classification Search
CPC .............................. H02M 1/36; H02M 1/0025
See application file for complete search history.

(56) References Cited

U.S. PATENT DOCUMENTS

| | | | |
|---|---|---|---|
| 5,841,641 A | 11/1998 | Faulk | |
| 8,350,541 B2 * | 1/2013 | Ojanen | H02M 3/157 323/266 |
| 9,158,315 B2 | 10/2015 | Chen | |
| 9,705,413 B2 | 7/2017 | Zhang et al. | |
| 10,333,403 B2 | 6/2019 | Huang et al. | |
| 11,095,221 B1 | 8/2021 | Hsu | |
| 11,646,663 B1 * | 5/2023 | Shum | H02M 1/36 323/271 |
| 2005/0007087 A1 * | 1/2005 | Pullen | H02M 3/156 323/283 |
| 2005/0088212 A1 * | 4/2005 | Leith | H02M 3/156 327/198 |
| 2006/0033477 A1 * | 2/2006 | Lee | H02M 1/36 320/166 |
| 2007/0236977 A1 * | 10/2007 | Rossi | H02M 3/1582 363/132 |

(Continued)

FOREIGN PATENT DOCUMENTS

CN    114785123 A    7/2022

*Primary Examiner* — Gustavo A Rosario-Benitez
(74) *Attorney, Agent, or Firm* — Slater Matsil LLP

(57) ABSTRACT

In accordance with an embodiment, a method for controlling a constant on-time switched mode power converter includes: generating a pulse signal having an on-time; during a soft-start phase of the power converter, successively increasing the on-time from an initial duration to a final duration, wherein the final duration is larger than the initial duration; sensing an output voltage of the power converter and generating a feedback signal proportional to the output voltage; adjusting a frequency of the pulse signal based on the feedback signal and a reference signal; and driving a power switch with the pulse signal to control the power switch and regulate the output voltage.

23 Claims, 11 Drawing Sheets

(56) References Cited

U.S. PATENT DOCUMENTS

| | | | |
|---|---|---|---|
| 2008/0238397 A1* | 10/2008 | Chen | H02M 1/36 |
| | | | 323/288 |
| 2013/0154594 A1 | 6/2013 | Zipperer et al. | |
| 2014/0266084 A1* | 9/2014 | Fan | H02M 3/156 |
| | | | 323/222 |
| 2015/0042299 A1* | 2/2015 | Li | H02M 3/1588 |
| | | | 323/271 |
| 2015/0256088 A1* | 9/2015 | Ohtake | H02M 1/36 |
| | | | 363/21.02 |
| 2017/0070149 A1* | 3/2017 | Guan | H02M 1/36 |
| 2018/0004240 A1* | 1/2018 | Gritti | G05F 3/26 |
| 2019/0268011 A1* | 8/2019 | Ren | H02M 3/1584 |
| 2020/0119641 A1* | 4/2020 | Liang | H02M 3/157 |
| 2023/0275573 A1* | 8/2023 | Mei | H02M 3/156 |
| | | | 323/271 |

* cited by examiner

CONSTANT ON-TIME POWER CONVERTER WITH ADJUSTABLE PULSE DURATION AND SOFT-START CONTROL

TECHNICAL FIELD

The present invention relates generally to a system and method, and, in particular embodiments, to a system and method for a constant on-time power converter.

BACKGROUND

Switched Mode Power Converters (SMPCs), or switch-mode power supplies (SMPS), play a pivotal role in a multitude of electronic devices, primarily because they provide tightly regulated output voltages with superior efficiency. The regulation of output power in these converters is achieved by rapidly switching a power transistor between an on-state and an off-state. The power transferred to the load is governed by the frequency or duty cycle of this switching.

The Constant On-Time (COT) control scheme, employed in various types of SMPSs, has been recognized for its fast transient response, uncomplicated structure, and stability over a broad range of input voltages. In COT converters, a fixed on-time period for the switching transistor is maintained, while the off-time, which is defined by auto-oscillating properties of the system, is adjusted to regulate the output voltage according to the input voltage and load conditions. COT converters find their usage in a wide array of applications, including but not limited to consumer electronics, automotive electronics, telecommunications, and industrial automation, where small, efficient, and responsive power conversion is indispensable.

However, conventional COT converters are often met with some challenges, especially during a soft-start phase, which is a transitional period where the converter moves from a non-operating to an operating state. During the transitional period, the power converter generates switching signals in order to increase the output voltage of the power converter from an inactive voltage (such as ground) to its target voltage. In this phase, the converter must quickly reach a stable operating state without causing damaging voltage overshoots or excessive settling times.

One issue encountered during the soft-start phase of conventional COT converters involves the occurrence of current transients. Current transients are temporary surges or spikes in current that occur when the converter switches from one state to another, such as during soft-start. These transients can generate potentially harmful effects on the overall system operation, including electromagnetic interference, thermal stress on the components, and undesired voltage fluctuations, leading to the instability of the power supply.

Furthermore, these current transients could become more severe under certain soft-start scenarios, such as when the output voltage is high, and/or the converter includes an inductor having a low inductance value, and the converter is operating with a high duty cycle (which commonly occurs during soft-start when the input voltage is very close to the output voltage of the converter). In such cases, these transients could lead to overcurrent conditions, potentially damaging the converter and the connected load. Therefore, effectively managing these current transients, particularly during soft-start, presents a considerable challenge for traditional COT power converters.

SUMMARY

In accordance with an embodiment, a method for controlling a constant on-time switched mode power converter includes: generating a pulse signal having an on-time; during a soft-start phase of the power converter, successively increasing the on-time from an initial duration to a final duration, wherein the final duration is larger than the initial duration; sensing an output voltage of the power converter and generating a feedback signal proportional to the output voltage; adjusting a frequency of the pulse signal based on the feedback signal and a reference signal; and driving a power switch with the pulse signal to control the power switch and regulate the output voltage.

In accordance with another embodiment, a switched-mode power converter includes: a feedback processing circuit having an input coupled to an output node of the switched-mode power converter; an on-time timer coupled to an output of the feedback processing circuit, the on-time timer configured to produce a pulse having an on-time duration based on a value of a signal applied to an on-time duration control port; and a first ramp signal generator having an output coupled to the on-time duration control port, the first ramp signal generator configured to produce a ramped reference signal during a soft-start phase of the switched-mode power converter and a substantially constant reference signal during normal operation of the switched-mode power converter.

In accordance with a further embodiment, a switched-mode power converter includes: a reference signal generator configured to produce a ramped reference signal during a soft-start phase of the switched-mode power converter and a substantially constant reference signal during normal operation of the switched-mode power converter; a half-bridge circuit having an input coupled to a power supply input node and an output coupled to an output of the switched-mode power converter; a gate driver coupled to a control input of the half-bridge circuit; a feedback processing circuit having a first input coupled to the output of the switched-mode power converter, a second input coupled to an output of the reference signal generator, the feedback processing circuit configured to produce a trigger signal having a frequency based on a difference between a signal at the output of the reference signal generator and a signal at the output of the switched-mode power converter; and a first pulse generator coupled to an output of the feedback processing circuit, the first pulse generator configured to produce a pulse having an on-time duration based on a value of a signal at the output of the reference signal generator.

BRIEF DESCRIPTION OF THE DRAWINGS

For a more complete understanding of the present invention, and the advantages thereof, reference is now made to the following descriptions taken in conjunction with the accompanying drawings, in which:

FIG. 2C depicts a constant on-time power converter according to a further embodiment of the present invention.

Figure 1A:
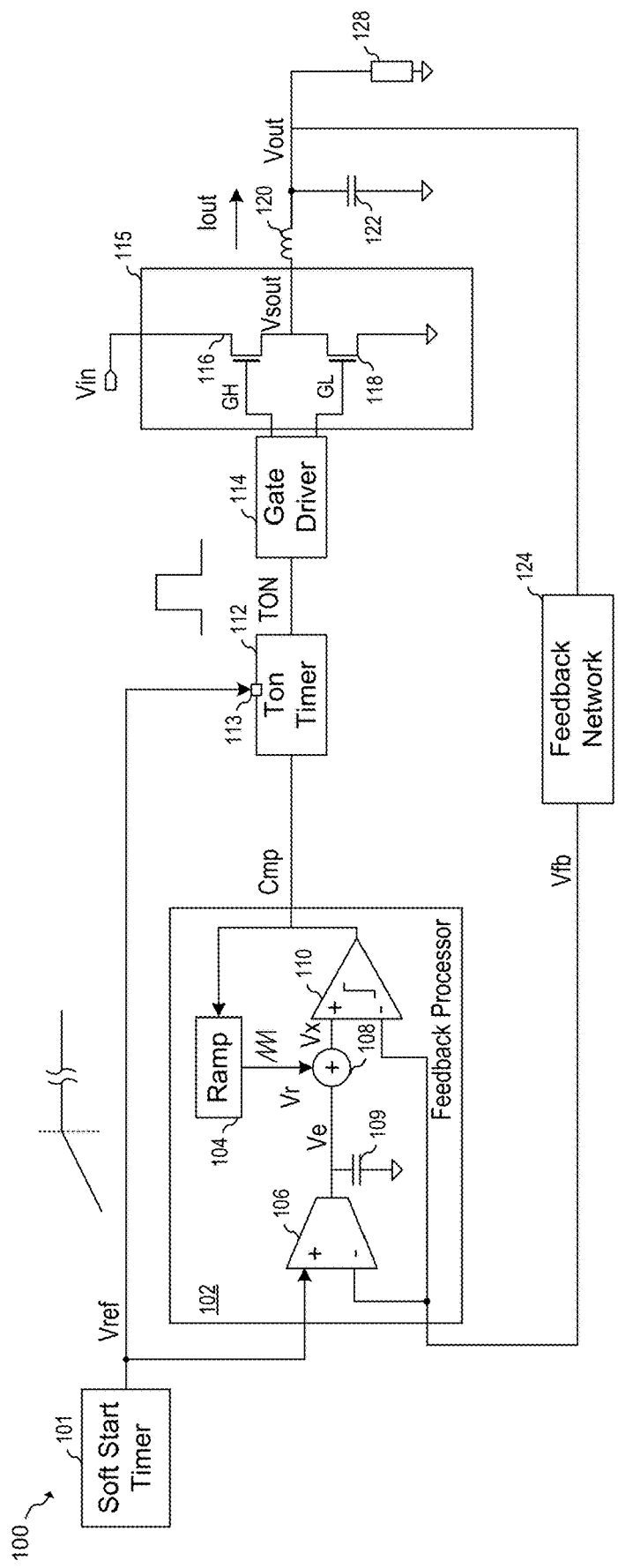
FIG. 1A depicts a constant on-time power converter according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various embodiments, during start-up of a switched-mode power converter, internal circuitry such as internal power supply regulators start to operate during a first phase (also referred to as an initial power-on phase) of the startup. Other components within the switched-mode power converter may also be disabled within this first phase of startup. Once the internal power supply regulators (e.g. linear regulators) have attained their requisite operational voltages, the second phase of start-up (which will be referred to herein as "soft-start") begins. One of the purposes of the second phase of startup is to allow the switched-mode power converter to reach its nominal operating conditions in a predictable and controlled manner. In some embodiments, the first phase may last a few hundreds of microseconds to a few milliseconds. The second phase (soft-start) following the first phase may last between 2 ms to 5 ms. It should be understood these times are only examples, and the actual amount of time spent in each phase could vary.

In some embodiments, the transition from the first phase to the soft-start phase may be triggered when an output of the internal power supply regulators has reached a predetermined voltage. Moreover, in some cases, the soft-start phase of the power supply could be triggered in other situations. For example, when a temperature of the power supply exceeds a first predetermined temperature, as measured by a temperature sensor circuit, the power supply may be shut down until the temperature decreases below a second predetermined temperature (that may or may not be different from the first predetermined temperature.) Once the measured temperature falls below the second predetermined temperature, the power supply is restarted by initializing the soft-start phase of the power supply. In some embodiments, the power supply is not shut down until the temperature exceeds the first predetermined temperature for a predetermined period of time that is measured, for example, by a timer circuit such as a counter. In some cases, the internal power supply regulators may remain active during the time that the power converter is shut down during this over-temperature condition.

In some embodiments, the power converter might be disabled when an output voltage of the internal power supply dips below a first predetermined voltage threshold as measured by a voltage sensor, such as a comparator. Such a condition may occur even when the internal power supply regulators are still active. Once the output voltage of the internal power supply reaches a second voltage threshold (which may be the same or different from the first voltage threshold), the soft-start mode may be triggered. In some embodiments, the power converter is disable after the voltage of the internal power supply dips below the first predetermined voltage threshold for a predetermined period of time as measured by a timer circuit, such as a counter.

Embodiments of the present invention are directed to constant on-time switch mode power converters. In one embodiment, the pulse width of the constant on-time pulse is progressively increased from a narrow pulse width to a broader pulse width during the soft-start (or startup) of the switch mode power converter. This progressive increase in pulse width can advantageously help in reducing or preventing large current transients or output current spikes during the converter's soft-start period. As mentioned above, during the soft-start period, the power converter generates switching signals in order to increase the output voltage of the power converter from an inactive voltage (such as ground) to its target voltage. Additionally, in some embodiments, the switching frequency of the pulses may be limited during the soft-start, which further conserves energy, mitigates current transients, and facilitates a more consistent output voltage trajectory.

FIG. 1A depicts a constant on-time power converter 100 comprising a feedback processing circuit 102, an on-time timer 112 (also referred to as a pulse generator or a pulse generation circuit), a gate driver 114 (also referred to as a driver circuit), a switching circuit 115, a feedback network 124, and a soft-start timer 101 (also referred to as a ramp signal generator or a reference signal generator). During nominal operation, the feedback processing circuit 102 generates a periodic trigger signal Cmp with a frequency proportional to the difference between the reference voltage Vref (also referred to as a ramped reference signal) produced by the soft-start timer 101 and the feedback voltage Vfb. The on-time timer 112 generates a pulse signal TON with a fixed pulse width at the signal node TON each time the trigger signal Cmp is asserted. The gate driver 114 drives the switching circuit 115 according to the pulse signal TON to provide output current Iout to load 128 via inductor 120 at output node Vout. Capacitor 122 may be employed for smoothing the output voltage Vout. An optional feedback network 124 conditions the output voltage Vout to produce the feedback signal Vfb. Feedback network 124 can be implemented using a resistive voltage divider, for instance, or may provide isolation through an opto-isolator.

The feedback processing circuit 102 includes an error amplifier 106, a ramp generator 104, a summer 108, and a comparator 110. During operation, the error amplifier 106 compares the reference voltage Vref and the feedback voltage Vfb to generate an error signal Ve. The error amplifier 106 can be implemented with a transconductance amplifier in some embodiments. In such embodiments, capacitor 109 connected to the amplifier's output may serve as an integration capacitor. The ramp generator 104 produces a ramp signal Vr, which is combined with the error signal Ve to create a summed signal Vx. This summed signal Vx is compared to the feedback signal Vfb using comparator 110 to generate the trigger signal Cmp. In some instances, the trigger signal Cmp is provided to the ramp generator 104 to reset the ramp signal Vr. In the illustrated embodiment, the combination of error amplifier 106 and capacitor 109 effectively adds an integration to the control loop of power converter 100 and increases the steady-state accuracy of the loop. However, in alternative embodiments of the present invention, error amplifier and capacitor 109 may be omitted such that reference voltage Vref is connected to the left input of summer 108 instead of error voltage Ve.

Figure 1B:
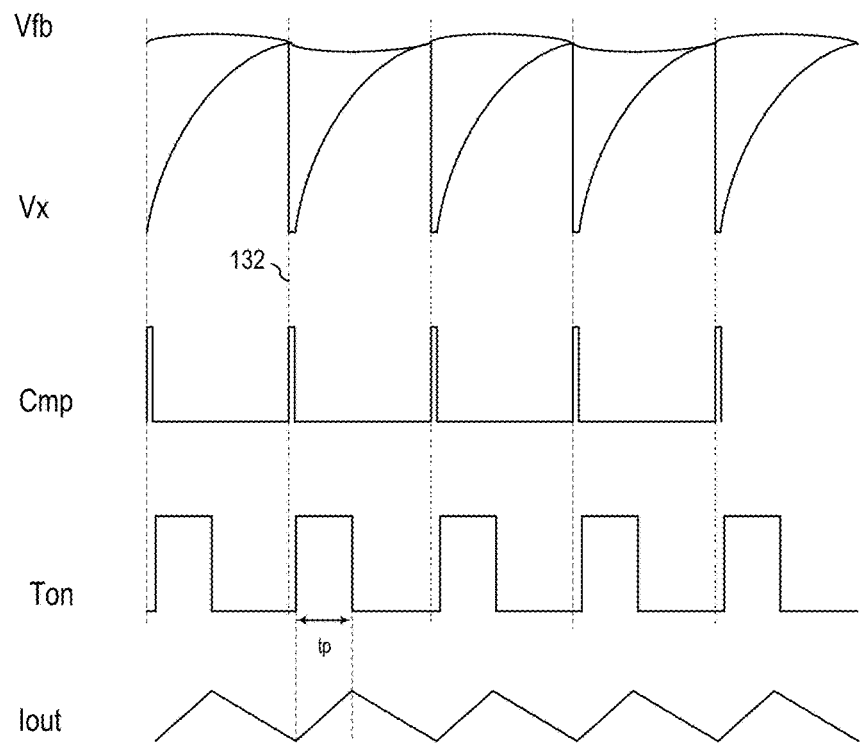
FIGS. 1B, 1C and 1D depict waveform diagrams illustrating the operation of the constant on-time power converter of FIG. 1A.

FIG. 1B illustrates a waveform diagram detailing the operation of switched-mode power converter 100, which displays feedback voltage Vfb, the signal Vx (sum of error voltage Ve and ramp voltage Vr), the trigger signal Cmp generated by comparator 110, and the constant width pulse signal TON. When signal Vx reaches the feedback voltage Vfb, the comparator 110 produces the trigger signal Cmp at time 132. This signal prompts the on-time timer 113 to generate a pulse signal TON with a pulse width $t_p$ and resets the ramp generator 104 to produce a new ramp. Resetting the ramp generator also resets signal Vx, causing the output Cmp of comparator 110 to turn low again.

As depicted, output current Iout flowing through inductor 120 increases linearly when pulse signal TON is high and decreases linearly when pulse signal TON is low. Operation continues in a similar manner during nominal operation of the switched-mode power converter 100.

Referring back to FIG. 1A, switching circuit 115 includes a high-side transistor 116 and a low-side transistor 118 that form a half-bridge circuit. Although these transistors are represented as NMOS devices, other transistor types, such as BJT, PMOS, IGBT, GaN and SiC may be used. The gate driver 114 can be implemented using gate driver circuits known in the art, and its implementation may vary based on the topology of switching circuit 115, the types of switching transistors used, and the specifications and architecture of the switched-mode power converter 100. While a buck-type topology is illustrated, embodiments of the invention can be configured as other types of switched-mode power converters like boost or buck-boost converters.

In one embodiment, the soft-start timer 101 generates a reference voltage that linearly increases during the soft-start of the switched-mode power converter 100 and maintains a substantially constant value under normal operation. By providing an increasing reference voltage to the feedback processing circuit 102, the output Vout of the switched-mode power converter 100 is ostensibly configured to increase in a controlled ramped manner. However, under certain conditions, the nominal pulse width provided by the on-time timer 112 may initially cause high output current Iout during soft-start of the power converter. This phenomenon may happen, for example, when the gate driver 114 activates transistor 116 while capacitor 122 is in its discharged state. Essentially, this action applies the entire input voltage Vin to the inductor, leading to an increasing current Iout as the inductor 120 charges/magnetizes.

In embodiments of the present invention, the pulse width provided by the on-time timer 112 is limited during the soft-start phase of the switched-mode power converter 100. The limited pulse width effectively restricts the current conducted by the inductor 120. In some embodiments, the pulse width of the pulse signal TON provided by the on-time timer progressively increases from an initial small value to its nominal value during normal operation. In such cases, the on-time timer 112 can be designed to offer a pulse signal with an adjustable pulse width. In the shown embodiment, the on-time timer 112 generates a pulse width that is adjustable based on a signal provided to an on-time duration control port 113. The reference voltage Vref from the soft-start timer 101 is supplied to the on-time duration control port in the illustrated example, enabling the pulse width provided by the on-time timer 112 to increase in accordance with the reference voltage Vref provided to the feedback processing circuit 102. In alternative embodiments, the signal provided at the on-time duration control port may be separate from the signal supplied to the feedback processing circuit 102.

Figure 1C:
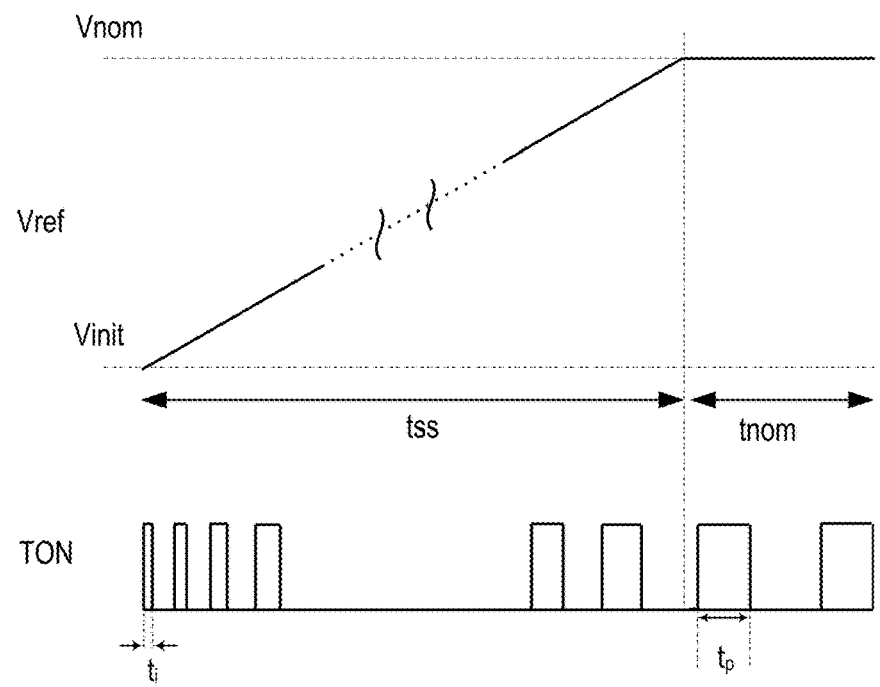

FIG. 1C shows a waveform diagram representing the reference signal Vref produced by the soft-start timer 101 and the pulse signal TON generated by the on-time timer 113 during soft-start and normal operation. As illustrated, during the soft-start phase, the reference voltage Vref linearly increases from an initial voltage Vinit to its final nominal voltage Vnom over soft-start period tss and serves as a ramped reference signal. In some embodiments, soft-start period tss may last a few milliseconds, for example, less than 5 ms; however, soft-start period tss may be 5 ms and greater in some embodiments depending on the particular application and its specifications. Simultaneously, the pulse width of the pulse signal TON increases from an initial pulse width $t_i$ to a final, fixed pulse width $t_p$. During nominal operation, indicated as time tnom, the reference voltage Vref remains substantially fixed at voltage Vnom to form a constant reference signal, and the pulse width of the pulse signal TON remains substantially constant at $t_p$.

Specific values for the initial pulse width $t_i$ and the final pulse width $t_p$ of pulse signal TON can be chosen according to the particular power converter system and its specifications. In one example, the initial pulse width $t_i$ of pulse signal TON is greater than zero (e.g., 40 ns to 60 ns), and the final pulse width $t_p$ of the signal is between 50 ns and 100 μs. For example, lower pulse-widths such as 50 ns may be used in cases where the conversion uses a minimum on-time during steady state conditions that might occur at high input voltage conditions while operating at high frequencies (e.g. Vin=100 V, Vout=5 V and switching frequency fsw=1 MHz). Higher pulse-widths such as 10 μs may be used in cases where the conversion uses a higher duty cycle during steady state conditions that might occur at low input voltage conditions while operating at lower frequencies (e.g. Vin=6 V, Vout=5 V and switching frequency fsw=83 KHz) Alternative embodiments may feature initial and final pulse width values outside of these ranges.

Figure 1D:
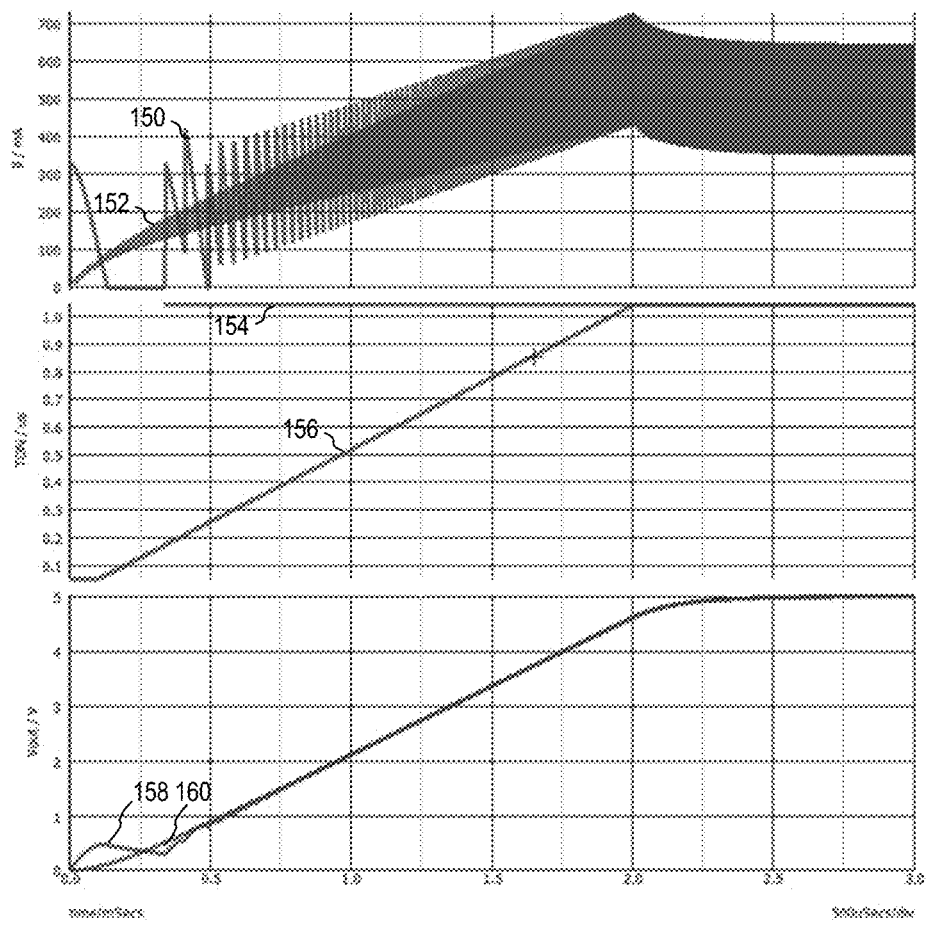

FIG. 1D is a waveform diagram that compares the performance of an embodiment switched-mode power converter 100 with a conventional constant on-time power converter during the soft-start phase. Trace 150 represents the output current of the conventional converter, trace 152 represents the output current Iout of the embodiment converter 100, trace 154 indicates the pulse width of the fixed pulse, trace 156 depicts the pulse width of the pulse signal TON, trace 158 represents the output voltage of the conventional converter, and trace 160 represents the output voltage of the embodiment converter 100. As shown, the output current 150 of the conventional converter exhibits an initial current spike exceeding 300 mA and sharp current transients when a constant pulse width of 1 μs (trace 154) is maintained during the soft-start phase. In contrast, the output current 152 of the embodiment power converter 100 displays a smooth, well-behaved increase as the pulse width of the pulse signal TON (trace 156) gradually increases from roughly 60 ns to 1 μs. It can also be observed that the output voltage (trace 158) of the conventional power converter is less monotonic compared to the output voltage (trace 160) of the embodiment switched-mode power converter 100. It should be noted that the comparative performance illustrated in FIG. 1D is merely one of numerous potential comparative examples. The performance of any specific embodiment switched-mode power converter may vary depending on the chosen embodiment and its specifications.

Figure 2A:
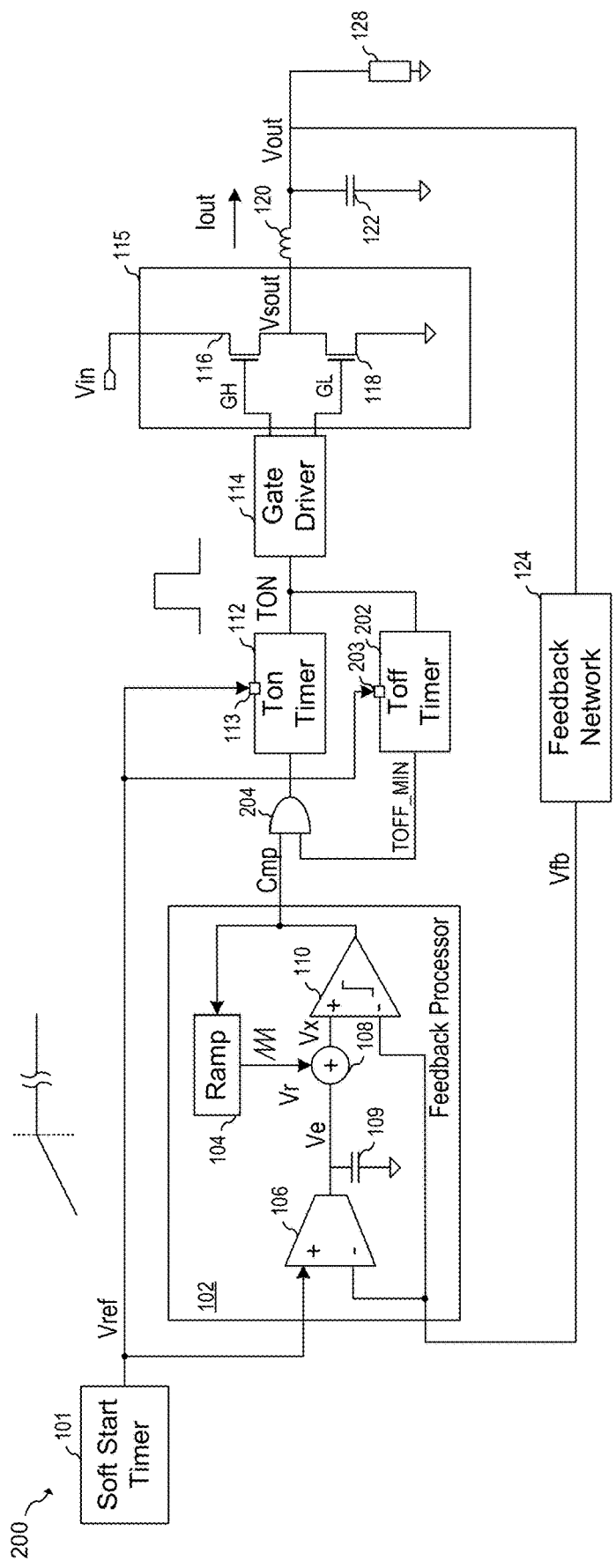
FIG. 2A depicts a constant on-time power converter according to another embodiment of the present invention.

FIG. 2A depicts a constant on-time power converter 200 according to a further embodiment of the present invention. Power converter 200 illustrated in FIG. 2A is similar to on-time power converter 100 depicted in FIG. 1A, but includes additional circuitry designed to limit the frequency of pulse signal TON during the soft-start phase of the power converter. This frequency limitation is accomplished using off-time timer 202 (also referred to as a frequency limiting circuit or frequency limiter) and AND gate 204 coupled to on-time timer 112.

Figure 2B:
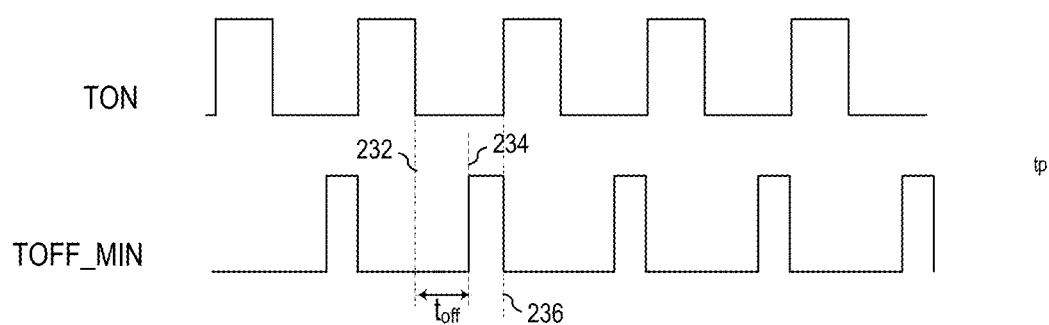
FIGS. 2B and 2C are waveform diagrams illustrating the operation of the constant on-time power converter of FIG. 2A.

In an embodiment, off-time timer 202, generates minimum off-time signal TOFF_MIN with an adjustable delay time $t_{off}$ following the falling edge of pulse signal TON. The waveform diagram of FIG. 2B shows the relationship between pulse signal TON and minimum off-time signal TOFF_MIN. At time 232, pulse signal TON displays a falling edge. Off-time timer 202 produces a rising edge of minimum off-time signal TOFF_MIN at time 234, which is a duration of $t_{off}$. Minimum off-time signal is reset at time 236 at the rising edge of pulse signal TON.

Referring back to FIG. 2A, the delayed assertion of minimum off-time signal TOFF_MIN in combination with AND gate 204 prevents pulse signal TON from being asserted until after minimum off-time signal TOFF_MIN is asserted a period $t_{off}$ following falling edge of pulse signal TON. This delay in activating the pulse signal TON effectively limits the frequency of the pulse signal TON.

In various embodiments, the duration of time period $t_{off}$ is can be modified by applying a control signal to off-time duration control port 203 of the off-time timer 202. Adjusting this control signal during the soft-start of constant on-time power converter 200, allows the maximum frequency of pulse signal TON to be adjusted during the soft-start phase, for instance, from a low frequency to successively higher frequencies.

Figure 2C:
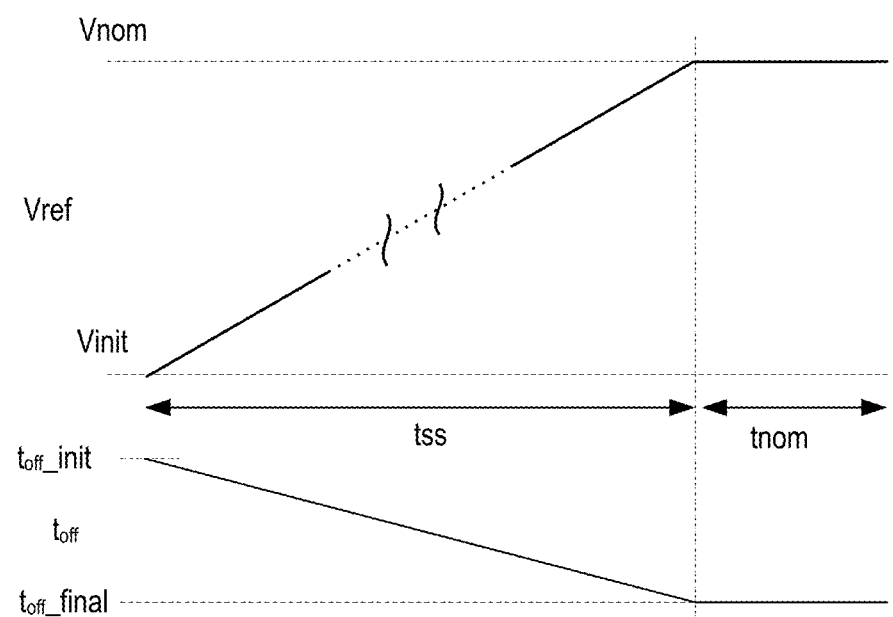

In some embodiments, reference voltage Vref produced by the soft-start timer 101 is applied to off-time duration control port 203 of the off-time timer 202 causing the off-time $t_{off}$ to decrease during the soft-start phase of constant on-time converter 200. As depicted in FIG. 2C, off time $t_{off}$ is initialized at $t_{off\_init}$ at the beginning of the soft-start phase during time period tss. During the soft-start phase, off-time $t_{off}$ decreases as reference voltage Vref increases. Upon conclusion of the soft-start period, when reference voltage Vref reaches its final value Vnom, off-time $t_{off}$ reaches its final value of $t_{off\_final}$. In some embodiments, the signal TOFF_MIN is set high during nominal operation period tnom of power converter 200 in order to disable the frequency limiting.

It is worth noting that the operation and implementation of the frequency limiting circuitry shown and described with respect to FIGS. 2A-2C represent just one of many possible implementations. Alternative embodiments of the present invention may employ different structures to achieve similar functionality. For example, the polarity of signals generated by the off-time timer 202 could be altered, and the AND gate 204 could be substituted with one or more distinct logic gates to produce logically comparable operation.

Figure 2D:
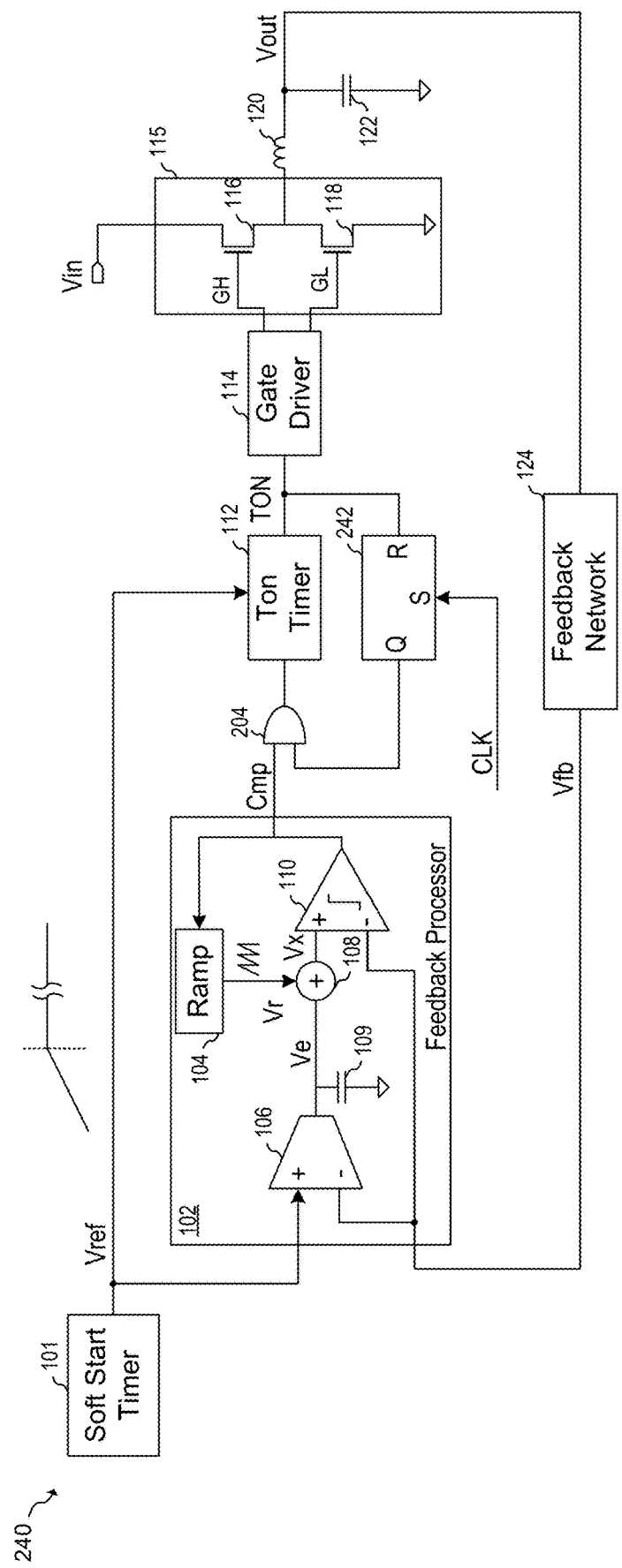
FIG. 2E is a waveform diagram illustrating the operation of the constant on-time power converter of FIG. 2D.
FIG. 2F is a waveform diagram illustrating the operation of the constant on-time power converters of FIGS. 1A, 2A and 2D.

FIG. 2D depicts a constant on-time power converter 240 in accordance with another embodiment of the present invention that is designed to limit the frequency of pulse signal TON during the soft-start phase of power converter by sampling the trigger signal Cmp output of feedback processing circuit 102 using a clock. Power converter 240 illustrated in FIG. 2D is similar to on-time power converter 200 depicted in FIG. 2A, except that off-time timer 202 is replaced by SR latch 242. The reset R input of SR latch 242 is connected to the output of on-time timer 112, its set S input is connected to a clock node CLK, and its output Q is connected to the input of AND gate 204. During operation, pulse signal TON's frequency is limited by the clock signal applied to the clock node CLK. Accordingly, ST latch 242 also functions as a frequency limiting circuit.

Figure 2E:
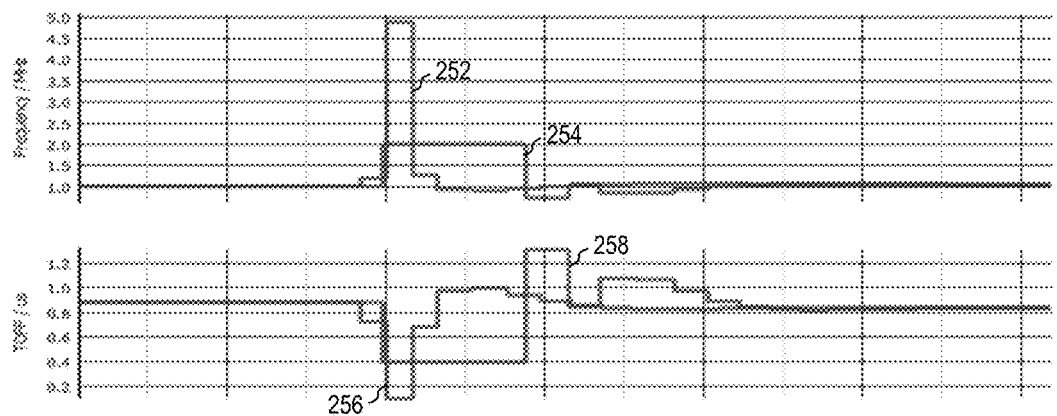

FIG. 2E illustrates a waveform diagram comparing the performance of the power converter 240 of FIG. 2D (with a 2 MHz signal applied to node CLK) to the power converter 100 of FIG. 1A when subjected to a load transient. Traces 252 and 254 represent the frequency of pulse signal TON for converters 100 and 240, respectively. As observed, the frequency of pulse signal TON rises to nearly 5 MHz for power converter 100, but is limited to 2 MHz for power converter 240. Traces 256 and 258 represent the off-time duration of pulse signal TON per cycle for converters 100 and 240, respectively. The off-time duration for pulse signal TON approaches 0.1 μs for power converter 100, but is set to be at least 0.4 μs for power converter 240.

Figure 2F:
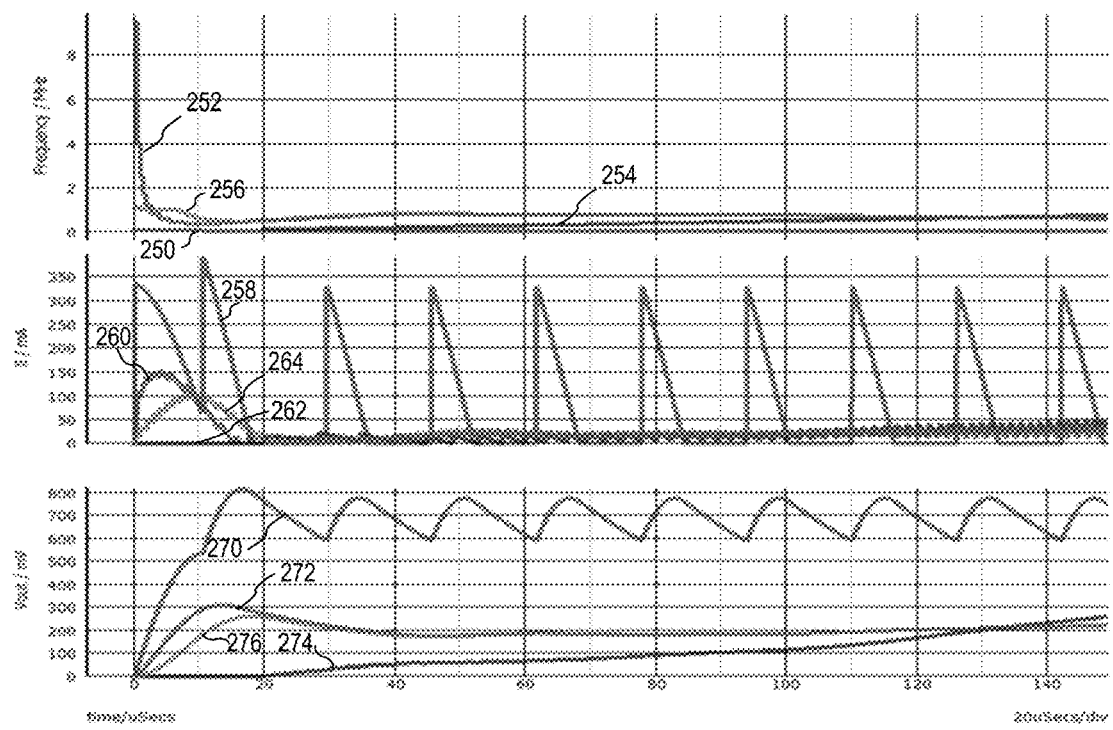

FIG. 2F illustrates a waveform diagram that compares the operation of a conventional constant on-time converter, power converter 100 (FIG. 1A), power converter 200 (FIG. 2A), and power converter 240 (FIG. 2D) during the soft-start phase. Traces 250, 252, 254 and 256 represent the frequency of pulse signal TON during soft-start for the conventional constant on-time converter, power converter 100, power converter 200 and power converter 240, respectively. As shown, the frequency 250 of the conventional power converter stays very low because the power converter is started with the regime value of on-time in which higher on-times correspond to higher off-times and lower frequencies. The frequency 252 of non-frequency limited power converter 100 reaches a maximum frequency of about 10 MHz because of the short period of pulse signal TON initially at soft-start. Power converter 200, which utilizes the off-time timer 202, displays a gradual frequency increase 254 during soft-start, while power converter 240, which employs a latch and fixed clock to limit the pulse signal TON's frequency 256, exhibits an operating frequency limited to about 800 KHz.

Traces 258, 260, 262 and 264 represent the output current during soft-start for the conventional constant on-time converter, power converter 100, power converter 200 and power converter 240, respectively. The output current 258 of non-frequency limited power converter 100 is shown as having multiple high transients with an initial output current of 325 mA. Output currents 260, 262 and 264 are considerably lower, where output current 262 corresponding to power converter 200 of FIG. 2A remains below 50 mA for the first 140 μs of operation.

Traces 270, 272, 274 and 276 represent the output voltage of conventional constant on-time converter, power converter 100, power converter 200 and power converter 240, respectively. The conventional constant on-time converter's output voltage oscillates between 600 mV and 800 mV during the soft-start phase of the power converter. Output voltages 272, 274, and 276, corresponding to the embodiment converters, exhibit more orderly behavior, with output voltage 274 (power converter 200 in FIG. 2A) demonstrating a slow, consistent increase during the soft-start phase.

Figure 3A:
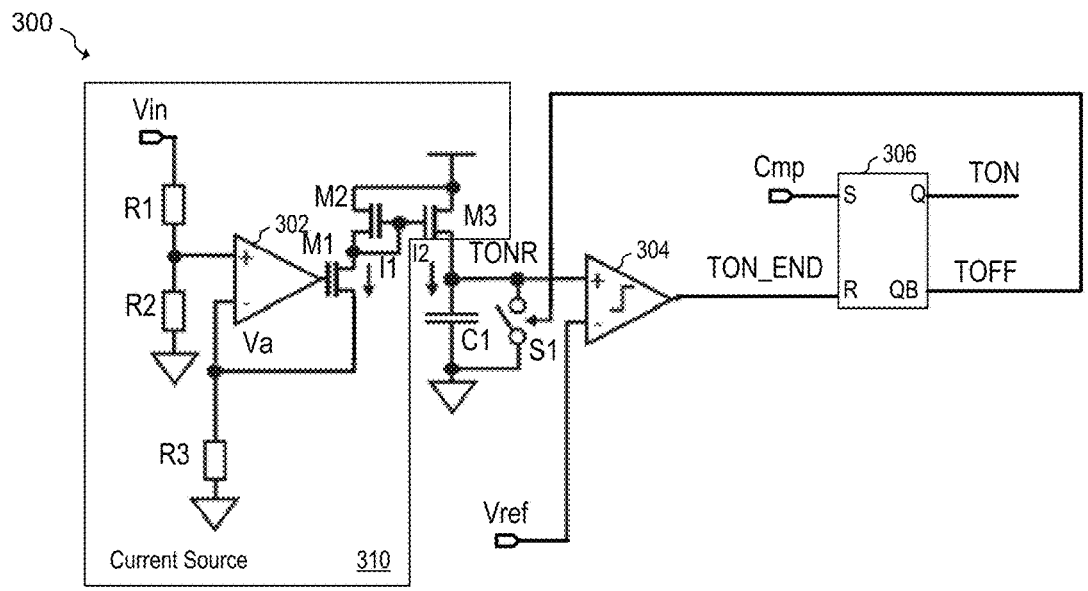
FIGS. 3A and 3B show schematics depicting circuit-level implementations of embodiment circuits.

FIG. 3A depicts a schematic illustrating a circuit-level embodiment of an on-time timer 300, which can be used to implement on-time timer 112 in the configurations presented in FIGS. 1A, 2A, and 2D. The on-time timer 300 comprises a current source 310, capacitor C1, switch S1, comparator 304, and SR latch 306.

In one embodiment, current source 310 is realized using resistors R1, R2 and R3, transistors M1, M2, and M3, and amplifier 302. Resistors R1 and R2 form a resistor divider, generating a voltage of Vin*R2/(R1+R2) at the positive terminal of amplifier 302. Negative feedback is supplied to the negative terminal (node Va) of amplifier 302 through transistor M1 and resistor resulting in a voltage of Vin*R2/(R1+R2) at node Va. Consequently, current I1 flowing through transistor M1 is Vin*R2/(R3*(R1+R2)). In some embodiments, the value of R3 is selected to have a value of K*$Vout_{nom}$/fsw, where K is a constant, $Vout_{nom}$ is a nominal output voltage of the converter, and fsw is the switching frequency of the converter. In some embodiments the value of R3 may be user programmable, for example, using a switchable resistor network with programmable setting stored in an internal register and/or addressable via device pins.

Transistors M2 and M3 mirror current I1 to form current I2, which charges capacitor C1. In this embodiment, transistor M1 is implemented using an NMOS transistor and transistors M2 and M3 are implemented using PMOS transistors. It should be noted that the structure of the current source 310 is only one of many possible configurations; alternative embodiments might use other known current source circuits.

Figure 3B:
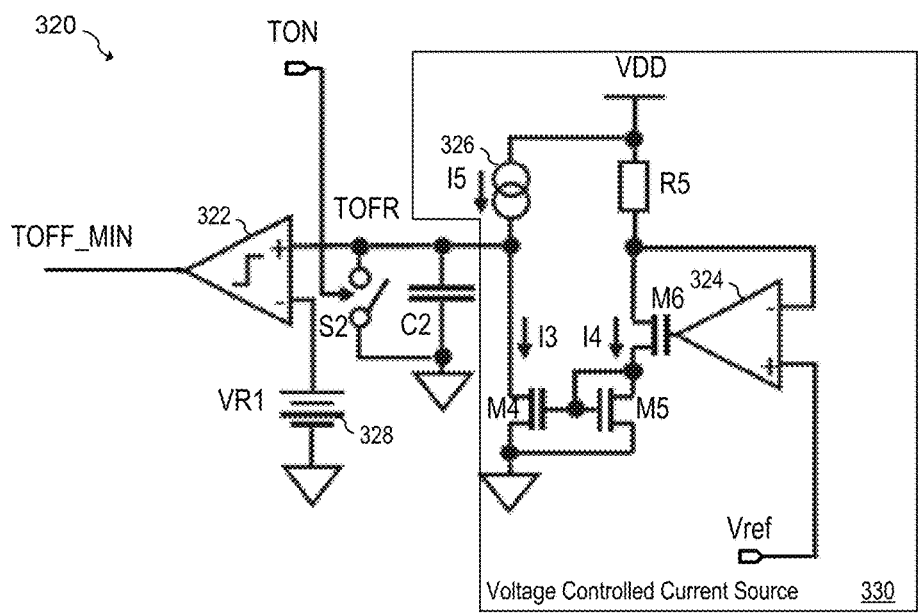

FIG. 3B illustrates a schematic of a circuit-level implementation of an off-time timer 320 in accordance with the present invention, which can be employed to implement off-timer 202 in the embodiment of FIG. 2A. The off-time timer 320 includes a voltage-controlled current source 330, comparator 322, capacitor C2, switch S2 having a load path coupled across capacitor C2, voltage source 328, and current source 326. In one embodiment, voltage source 328 delivers a fixed voltage to a fixed reference voltage node (connected to the negative input terminal of comparator 322) and can be implemented using well-known voltage reference circuits, such as a bandgap voltage reference. The specific voltage provided by voltage source 328 may be, for example, 0.5 V; however, any suitable voltage level may be used depending on the particular system and its specifications.

In an embodiment, voltage controlled current source 330 is realized using resistor R5, amplifier 324, transistors M4, M5 and M6, and current source I5. During operation, amplifier 324 and transistor M6 apply reference voltage Vref to resistor R5, generating a current I4=(VDD−Vref)/R5 flowing through transistor M6. The positive input of amplifier 324 serves as a control node of the voltage controlled current source. Current I4 is mirrored by transistors M4 and M5 to generate current I3. The difference between current I3 and I5 produced by current source 326, charges capacitor C2. In an embodiment, transistor M6 is implemented using a PMOS transistor and transistors M2 and M3 are implemented using NMOS transistors. It should be understood that the structure of the voltage-controlled current source 330 is only one of many possible configurations; alternative embodiments might use other known controlled current source circuits.

The operation of on-time timer 300 depicted in FIG. 3A and off-time timer 320 depicted in FIG. 3B will now be described in conjunction with FIG. 3C that illustrates a timing diagram showing the operation of these circuits.

Figure 3C:
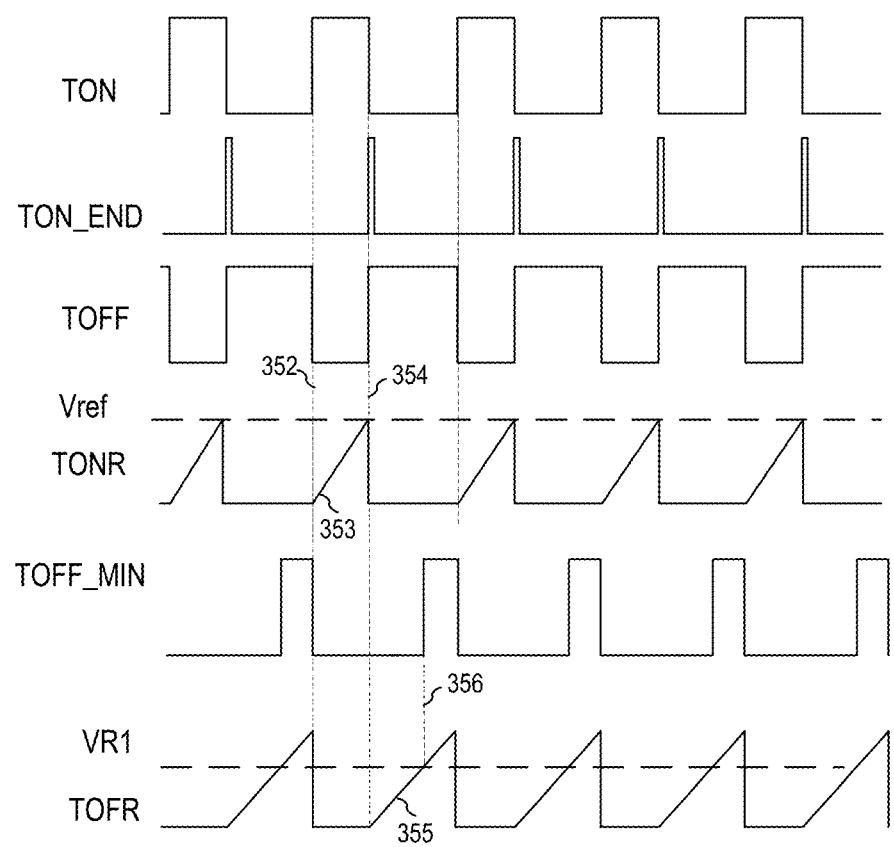
FIG. 3C is a waveform/timing diagram showing the operation of the circuits of FIGS. 3A and 3B, and FIGS. 3D and 3E illustrate schematics depicting circuit-level implementations of other embodiment circuits.

With regard to on-time timer 300 shown in FIG. 3A, during operation, when trigger signal Cmp (not shown in FIG. 3C) is asserted by feedback processing circuit 102 and is applied to the set input of SR latch 306, pulse signal TON is activated at the Q output and the inverse TOFF of pulse signal TON is de-asserted at the Q and QB outputs of SR latch 306 at time 352 shown in FIG. 3C. The deactivation of TOFF closes switch S1 allowing current source 310 to charge capacitor C1 with current I2, which causes a corresponding increase 353 in the capacitor voltage at node TONR.

When voltage TONR across capacitor C1 reaches reference voltage Vref (produced by soft-start timer 101) as measured by comparator 304, signal TON_END is asserted at time 354, which resets SR latch 306. When SR latch 306 is reset, signal TOFF is asserted, causing switch S1 to discharge capacitor C1. Capacitor C1 remains discharged until signal Cmp is once again asserted by feedback processor 102. Since the voltage TONR is compared to reference voltage Vref, it can be seen that the length of pulse signal TON is proportional to reference voltage Vref. Accordingly, at the beginning of the soft-start phase of the power converter, voltage Vref is very low, meaning that the voltage TONR only charges to a small voltage before comparator 304 is triggered. As reference voltage Vref increases, the pulse width of pulse signal TON sees a corresponding increase due to the increased time that it takes for the voltage of TONR to ramp up to the reference voltage Vref as detected by comparator 304.

With regard to off-time timer 320 shown in FIG. 3B, during operation, when signal TON is de-asserted at time 354, switch S2 is opened, allowing capacitor C2 to be charged with current I5-I3, thereby causing a corresponding increase 355 on the voltage TOFR across capacitor C2. When voltage TOFR reaches voltage VR1 produced by voltage source 328, comparator 322 asserts signal TOFF_MIN at time 356. As discussed above with respect to the embodiment of FIG. 2A, pulse signal TON is prevented from being asserted until signal TOFF_MIN is asserted.

It should be appreciated that the slope of voltage TOFR is proportional to reference voltage Vref generated by soft-start timer 101 so that the slope of voltage TOFR increases with increasing reference voltage Vref. Accordingly, the lower the slope, the longer it takes for signal TOFF_MIN to be asserted, which translates into a lower frequency for pulse signal TON.

Figure 3D:
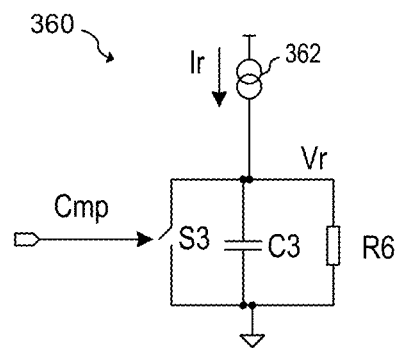

FIG. 3D illustrates a schematic of an embodiment ramp generator 360 that could be used to implement ramp generator 104 shown in FIGS. 1A, 2A and 2D. The ramp generator 360 comprises a current source 362, capacitor C3, resistor R6, and switch S3. During operation, current source 362 charges the parallel RC circuit composed of capacitor C3 and R6 until the sum Vx of ramp voltage Vr and error voltage Ve reaches the threshold voltage Vfb of comparator 110 (FIGS. 1A, 2A, and 2D), causing comparator 110 to assert trigger signal Cmp. When trigger signal Cmp is asserted, switch S3 is closed, resetting ramp voltage Vr to zero volts. The resulting decrease in voltage Vr subsequently causes the output Cmp of comparator 110 to go low. When trigger signal Cmp goes low, switch S3 is opened again, and the operational cycle repeats with ramp voltage Vr rising again.

Current source 362 may be implemented using known current source circuits.

Figure 3E:
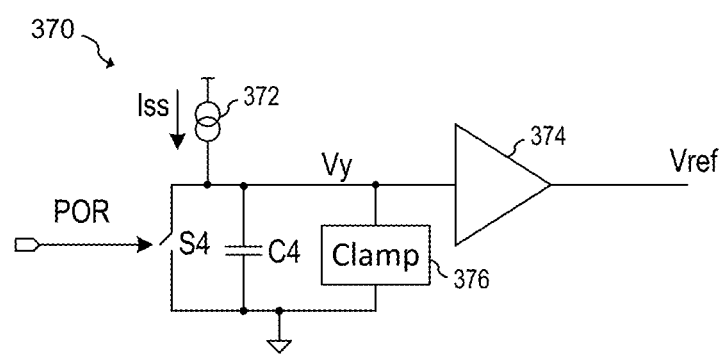

FIG. 3E illustrates an embodiment soft-start timer 370 that could be employed to implement soft-start timer 101 shown in FIGS. 1A, 2A and 2D. The soft-start timer includes current source 372, switch S4, capacitor C4, voltage clamp 376 and voltage buffer 374, During operation, when power-on reset signal POR become de-asserted (e.g. goes low), switch S4 is opened and current Iss generated by current source 372 charges capacitor C4, resulting in a linearly increasing ramped voltage Vy across capacitor C4. When voltage Vy across capacitor C4 reaches the nominal operating voltage for reference voltage Vref, clamp circuit 376 clamps the voltage across capacitor C4 to reference voltage Vref. In some embodiments, voltage Vy is buffered using buffer amplifier 374.

Current source 372 may be implemented using known current source circuits, such as a current mirror coupled to a reference current generator as shown with respect to current source 310 shown in FIG. 3A. Buffer amplifier 374 can be implemented using an operational amplifier in a non-inverting unity gain configuration or using a source or emitter follower transistor circuit. Clamp circuit 376 can be implemented using known clamp circuits, such as one or more diodes connected in series between node Vy and ground (or other reference voltage nodes).

In various embodiments, signal POR is asserted by a controller circuit (not shown) within the embodiment power converter. As mentioned above, during the start-up of the power converter, internal circuitry such as internal power supply regulators start to operate during a first phase of the startup. During this first phase of starting the power converter signal POR may remain asserted in order to keep the reference voltage Vref at ground potential. Once the internal power supply regulators have attained their requisite operational voltages, the second phase of start-up (soft-start) begins. At this point, signal POR is de-asserted and the soft-start timer 370 begins to provide the ramped reference voltage Vref.

Figure 4:
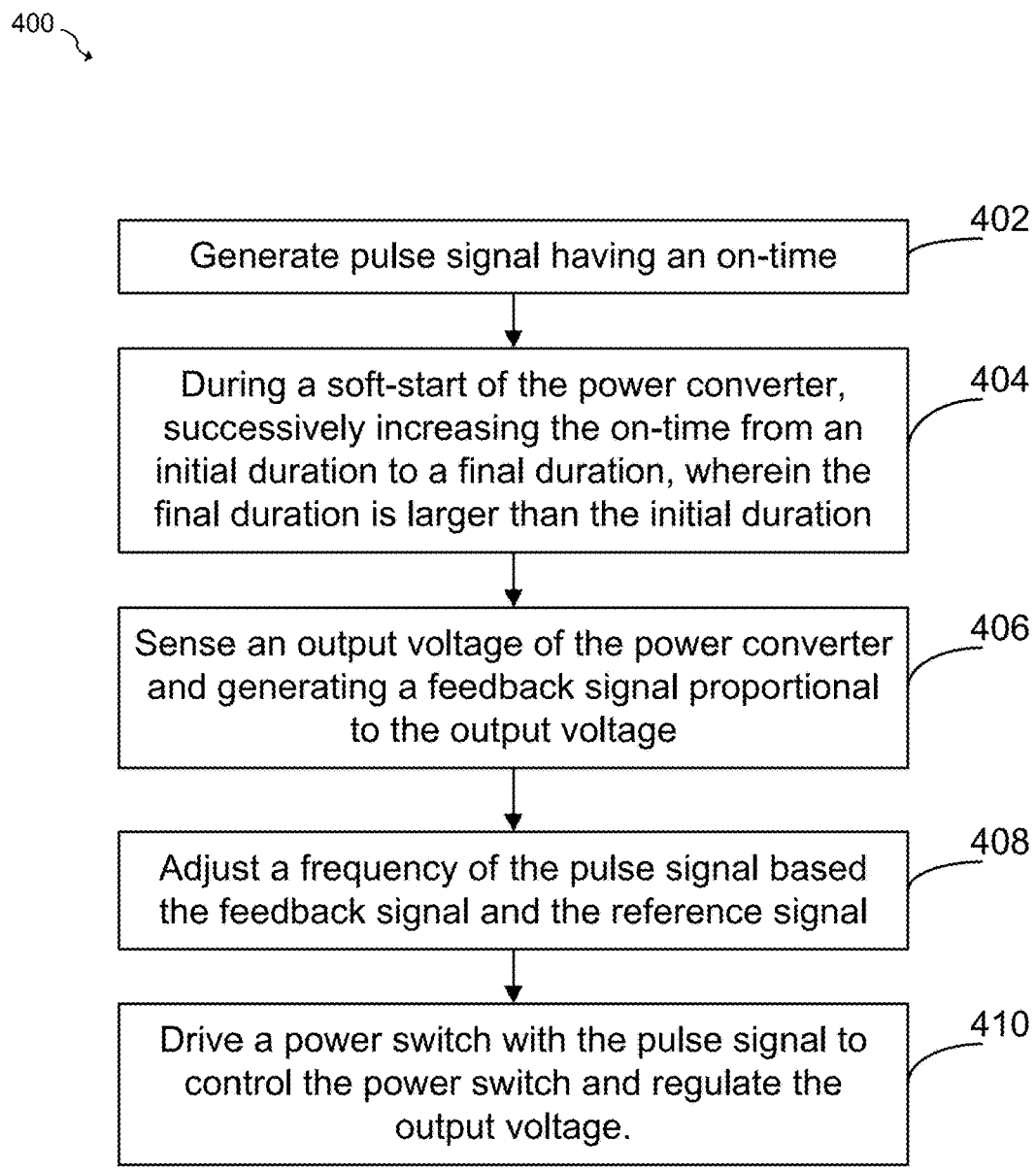
FIG. 4 illustrates a flowchart of a method according to an embodiment of the present invention.

FIG. 4 illustrates a flowchart of a method 400 according to an embodiment of the present invention. Referring to FIG. 4 and corresponding components in FIGS. 1A, 2A, and 2D, the method commences with step 402, where a pulse signal is generated having an on-time duration. This step may be performed, for example, by on-time timer 112 discussed above. In step 404, during the soft-start phase of the power converter, the on-time duration is successively increased from an initial duration to a final duration, where the final duration is larger than the initial duration. In some cases, however, the final duration may be equal to the initial duration. This process may be performed, for example, by the on-time timer 112 in conjunction with the soft-start timer 101, which generates a ramped reference voltage Vref during the soft-start phase. With the increasing reference voltage Vref, the on-time of the pulse signal produced by on-time timer 112 increases accordingly. In some embodiments, step 404 is only performed during the soft-start phase of the power converter. Moreover, in various embodiments, the on-time-duration is kept substantially constant (e.g., at the final duration) during a normal operation phase of the power converter.

Step 406 involves sensing the output voltage of the power converter and generating a feedback signal proportional to the output voltage. This task may be performed by the feedback network 124 and the feedback processing circuit 102. Together, these components allow for monitoring and assessment of the output voltage to achieve voltage regulation.

The feedback signal generated in step 406 is then compared with a reference signal in step 408 to produce an error signal. This comparison is carried out by the error amplifier 106 within the feedback processing circuit 102. By producing an error signal, the system can determine whether any adjustments are necessary to achieve the desired output voltage. In step 408, the frequency of the pulse signal is adjusted based on the feedback signal obtained in the previous step and a reference. This adjustment may made, for example, by the feedback processing circuit 102 to effect the frequency of pulses seen at output Cmp of comparator 110. In some embodiments, the feedback signal generated in step 406 is compared with a reference signal in step 408 to produce an error signal. This comparison is carried out by the error amplifier 106 within the feedback processing circuit 102. By producing an error signal, the system can determine whether any adjustments are necessary to achieve the desired output voltage. Next, the error signal is summed with a ramp signal and the summed signal is compared to feedback signal using comparator 110 to produce a periodic trigger signal having a frequency that varies according to the feedback valley regulation respect to the summed node (e.g. Vx=Vr+Ve). Alternatively, the error amplifier may be omitted such that the reference signal is summed with the ramp signal and the summed signal is compared with the feedback signal using comparator 110 to produce the periodic trigger signal.

Finally, in step 410, the power switch is driven by the pulse signal to control the power switch and regulate the output voltage. This step may be performed, for example, by gate driver 114. In various embodiments, method steps 402, 406, 408 and 410 are performed during the soft-start phase in addition to step 404.

In various embodiments, some or all of the components of power converters 100, 200 and 240 depicted in FIGS. 1A, 2A and 2D may be implemented using one or more integrated circuits. In some embodiments, some or all of the components of these power converters may be disposed on a single monolithic semiconductor integrated circuit, such as a single semiconductor substrate, and/or on the same monolithic semiconductor integrated circuit as other disclosed system components. The semiconductor substrate may be a silicon substrate. Integrated circuit 102 may be fabricated using one of a variety of different semiconductor processes, such as a CMOS process, a BiCMOS process, a Bipolar process, or other type of semiconductor process.

In some embodiments, all components of power converters 100, 200 and 240 depicted in FIGS. 1, 2A and 2D are disposed on a single semiconductor substrate with the exception of inductor 120, feedback network 124 and/or capacitor 122, which may be implemented external to the semiconductor substrate. In some embodiments, switching circuit 115 may be implemented external to the single semiconductor substrate.

Embodiments of the present invention are summarized here. Other embodiments can also be understood from the entirety of the specification and the claims filed herein.

Example 1. A method for controlling a constant on-time switched mode power converter, the method including: generating a pulse signal having an on-time; during a soft-start phase of the power converter, successively increasing the on-time from an initial duration to a final duration, where the final duration is larger than the initial duration; sensing an output voltage of the power converter and generating a feedback signal proportional to the output voltage; adjusting a frequency of the pulse signal based on the feedback signal and a reference signal; and driving a power switch with the pulse signal to control the power switch and regulate the output voltage.

Example 2. The method of example 1, further including limiting a switching frequency of the pulse signal to a first switching frequency during the soft-start phase of the power converter.

Example 3. The method of example 2, where limiting the switching frequency of the pulse signal includes successively decreasing an off-time between pulses of the pulse signal from a first duration to a second duration less than the first duration.

Example 4. The method of example 2, further including generating a trigger signal based on the feedback signal and the reference signal, where limiting the switching frequency of the pulse signal includes sampling the trigger signal using a clock.

Example 5. The method of example 2, where limiting the switching frequency of the pulse signal includes clocking a latch having an output coupled to an input of a pulse generation circuit and an input coupled to an output of the pulse generation circuit.

Example 6. The method of one of examples 1 to 5, further including generating the reference signal by increasing the reference signal from a first value to a second value during the soft-start phase of the power converter to form a ramped reference signal.

Example 7. The method of example 6, where generating the pulse signal includes: generating a ramp signal; comparing the ramp signal with a threshold proportional to the ramped reference signal; resetting the ramp signal when the ramp signal exceeds the threshold; and asserting the pulse signal when the ramp signal is less than the threshold.

Example 8. The method of example 7, where: generating the ramp signal includes charging a capacitor; and resetting the ramp signal includes turning on a switch coupled between a first terminal and a second terminal of the capacitor.

Example 9. The method of one of examples 1 to 8, where successively increasing the on-time from the initial duration to the final duration decreases output current spikes during the soft-start phase of the power converter.

Example 10. The method of one of examples, 1 to 9, where the method further includes maintaining the on-time at the final duration during a normal operation phase of the power converter.

Example 11. The method of one of examples 1 to 10, where successively increasing the on-time from the initial duration to the final duration is only performed during the soft-start phase of the power converter.

Example 12. The method of one of examples 1 to 11, wherein the steps of: generating the pulse signal, sensing the output voltage of the power converter, generating the feedback signal, adjusting the frequency of the pulse signal, and driving the power switch are performed during the soft-start phase of the power converter.

Example 13. A switched-mode power converter including: a feedback processing circuit having an input coupled to an output node of the switched-mode power converter; an on-time timer coupled to an output of the feedback processing circuit, the on-time timer configured to produce a pulse having an on-time duration based on a value of a signal applied to an on-time duration control port; and a first ramp signal generator having an output coupled to the on-time duration control port, the first ramp signal generator configured to produce a ramped reference signal during a soft-start phase of the switched-mode power converter and a substantially constant reference signal during normal operation of the switched-mode power converter.

Example 14. The switched-mode power converter of example 13, further including a frequency limiting circuit configured to limit an output frequency of the on-time timer.

Example 15. The switched-mode power converter of example 14, where: the frequency limiting circuit includes an off-time timer having an input coupled to an output of the on-time timer and an output coupled to an input of the on-time timer; the off-time timer is configured to produce a pulse having a duration based on a value of a signal applied to a duration control port of the off-time timer; and the output of the first ramp signal generator is further coupled to the duration control port of the off-time timer.

Example 16. The switched-mode power converter of example 15, where the off-time timer includes: a first voltage controlled current source having a control node coupled to the output of the first ramp signal generator; a first capacitor coupled to the first voltage controlled current source; a first switch having a load path coupled across the first capacitor and a control node coupled to an output of the on-time timer; and a first comparator having a first input coupled to the first capacitor and a second input coupled to a fixed reference voltage node.

Example 17. The switched-mode power converter of example 14, where the frequency limiting circuit includes an SR latch having a first input coupled to an output of the on-time timer, a second input coupled to a clock node, and an output coupled to an input of the on-time timer.

Example 18. The switched-mode power converter of one of examples 13 to 17, further including: a driver circuit having an input coupled to an output of the on-time timer; and a switching circuit coupled between and input node and the output node of the switched-mode power converter.

Example 19. The switched-mode power converter of example 18, where the switching circuit includes an MOS half-bridge circuit.

Example 20. The switched-mode power converter of one of examples 13 to 19, where the feedback processing circuit includes: an error amplifier having a first input coupled to the output node of the switched-mode power converter, and a second input coupled to an output of the first ramp signal generator; a second ramp signal generator; and a comparator having a first input configured to receive a sum of an output of the error amplifier and an output of the second ramp signal generator, and a second input coupled to the output node of the switched-mode power converter.

Example 21. A switched-mode power converter including: a reference signal generator configured to produce a ramped reference signal during a soft-start phase of the switched-mode power converter and a substantially constant reference signal during normal operation of the switched-mode power converter; a half-bridge circuit having an input coupled to a power supply input node and an output coupled to an output of the switched-mode power converter; a gate driver coupled to a control input of the half-bridge circuit; a feedback processing circuit having a first input coupled to the output of the switched-mode power converter, a second input coupled to an output of the reference signal generator, the feedback processing circuit configured to produce a trigger signal having a frequency based on a difference between a signal at the output of the reference signal generator and a signal at the output of the switched-mode power converter; and a first pulse generator coupled to an output of the feedback processing circuit, the first pulse generator configured to produce a pulse having an on-time duration based on a value of a signal at the output of the reference signal generator.

Example 22. The switched-mode power converter of example 21, further including a frequency limiter coupled to the first pulse generator.

Example 23. The switched-mode power converter of example 22, where the frequency limiter includes a second pulse generator configured to produce a pulse having a pulse width inversely proportional to the signal at the output of the reference signal generator.

Example 24. The switched-mode power converter of one of examples 21 to 23, further including an inductor coupled between the output of the half-bridge circuit and the output of the switched-mode power converter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for controlling a constant on-time switched mode power converter, the method comprising:
   receiving, by a feedback processing circuit, a feedback signal from an output of a power converter and a reference signal from an output of a ramp signal generator;
   generating, by an on-time timer coupled to an output of the feedback processing circuit, a pulse signal having an on-time duration based on a value of a signal applied to an on-time duration control port of the on-time timer;
   during a soft-start phase of the power converter, successively increasing the on-time duration from an initial duration to a final duration in response to a ramped reference signal generated by a first ramp signal generator coupled to the on-time duration control port, wherein the final duration is larger than the initial duration;
   sensing, by the feedback processing circuit, an output voltage of the power converter and generating the feedback signal proportional to the output voltage;
   adjusting, by the feedback processing circuit, a frequency of the pulse signal based on the feedback signal and reference signal;
   limiting, by a frequency limiting circuit, an output frequency of the feedback processing circuit, the frequency limiting circuit comprising an SR latch having a first input coupled to an output of the on-time timer, a second input coupled to a clock node, and an output node coupled to an input of the on-time timer; and
   driving a power switch with the pulse signal to control the power switch and regulate the output voltage.

2. The method of claim 1, further comprising limiting a switching frequency of the pulse signal to a first switching frequency during the soft-start phase of the power converter.

3. The method of claim 2, wherein limiting the switching frequency of the pulse signal comprises successively decreasing an off-time between pulses of the pulse signal from a first duration to a second duration less than the first duration.

4. The method of claim 2, further comprising generating a trigger signal based on the feedback signal and the reference signal, wherein limiting the switching frequency of the pulse signal comprises using a clock to control a latch that gates the trigger signal for pulse generation.

5. The method of claim 2, wherein limiting the switching frequency of the pulse signal comprises clocking a latch having an output coupled to an input of a pulse generation circuit and an input coupled to an output of the pulse generation circuit.

6. The method of claim 1, further comprising generating the reference signal by increasing the reference signal from a first value to a second value during the soft-start phase of the power converter to form the ramped reference signal.

7. The method of claim 6, wherein generating the pulse signal comprises:
   generating a ramp signal;
   comparing the ramp signal with a threshold proportional to the ramped reference signal;
   resetting the ramp signal when the ramp signal exceeds the threshold; and
   asserting the pulse signal when the ramp signal is less than the threshold.

8. The method of claim 7, wherein:
   generating the ramp signal comprises charging a capacitor; and
   resetting the ramp signal comprises turning on a switch coupled between a first terminal and a second terminal of the capacitor.

9. The method of claim 1, wherein successively increasing the on-time duration from the initial duration to the final duration decreases output current spikes during the soft-start phase of the power converter.

10. The method of claim 1, further comprising maintaining the on-time duration at the final duration during a normal operation phase of the power converter.

11. The method of claim 1, wherein successively increasing the on-time duration from the initial duration to the final duration is only performed during the soft-start phase of the power converter.

12. A switched-mode power converter comprising:
   a feedback processing circuit having an input coupled to an output node of the switched-mode power converter;
   an on-time timer coupled to an output of the feedback processing circuit, the on-time timer configured to produce a pulse having an on-time duration based on a value of a signal applied to an on-time duration control port;
   a frequency limiting circuit comprising an SR latch having a first input coupled to an output of the on-time timer, a second input coupled to a clock node, and an output node coupled to an input of the on-time timer, wherein the frequency limiting circuit is configured to limit an output frequency of the on-time timer; and
   a first ramp signal generator having an output coupled to the on-time duration control port, the first ramp signal generator configured to produce a ramped reference signal during a soft-start phase of the switched-mode power converter and a substantially constant reference signal during a normal operation of the switched-mode power converter.

13. The switched-mode power converter of claim 12, wherein:
   the frequency limiting circuit comprises an off-time timer having an input coupled to an output of the on-time timer and an output coupled to an input of the on-time timer; and
   the off-time timer is configured to produce a second pulse having a duration based on the value of the signal applied to a duration control port of the off-time timer, wherein the signal applied to the duration control port of the off-time timer is an output of the first ramp signal generator.

14. The switched-mode power converter of claim 13, wherein the off-time timer comprises:
   a first voltage controlled current source having a control node coupled to the output of the first ramp signal generator;

a first capacitor coupled to the first voltage controlled current source;

a first switch having a load path coupled across the first capacitor and a control node coupled to an output of the on-time timer; and a first comparator having a first input coupled to the first capacitor and a second input coupled to a fixed reference voltage node.

15. The switched-mode power converter of claim 12, further comprising:

a driver circuit having an input coupled to an output of the on-time timer; and a switching circuit coupled between an input node and the output node of the switched-mode power converter.

16. The switched-mode power converter of claim 15, wherein the switching circuit comprises a MOS half-bridge circuit.

17. The switched-mode power converter of claim 12, wherein the feedback processing circuit comprises:

an error amplifier having a first input coupled to the output node of the switched-mode power converter, and a second input coupled to an output of the first ramp signal generator;

a second ramp signal generator; and a comparator having a first input configured to receive a sum of an output of the error amplifier and an output of the second ramp signal generator, and a second input coupled to the output node of the switched-mode power converter.

18. A switched-mode power converter comprising:

a reference signal generator configured to produce a ramped reference signal during a soft-start phase of the switched-mode power converter and a substantially constant reference signal during a normal operation of the switched-mode power converter;

a half-bridge circuit having an input coupled to a power supply input node and an output coupled to an output of the switched-mode power converter;

a gate driver coupled to a control input of the half-bridge circuit;

a feedback processing circuit comprising a ramp signal generator, an error amplifier having a first input coupled to the output of the switched-mode power converter and a second input coupled to an output of the reference signal generator, and a comparator having a first input configured to receive a sum of an output of the error amplifier and an output of the ramp signal generator, the comparator having a second input coupled to an output node of the switched-mode power converter, the feedback processing circuit configured to produce a trigger signal having a frequency based on input signals at the first input and the second input of the error amplifier; and a first pulse generator coupled to an output of the feedback processing circuit, the first pulse generator configured to produce a pulse having an on-time duration based on a value of the signal at the output of the reference signal generator.

19. The switched-mode power converter of claim 18, further comprising a frequency limiter comprising an off-time timer having an input coupled to an output of the first pulse generator and an output coupled to an input of the first pulse generator, the off-time timer configured to produce the pulse.

20. The switched-mode power converter of claim 19, wherein the frequency limiter comprises a second pulse generator configured to produce a second pulse having a pulse width inversely proportional to the signal at the output of the reference signal generator.

21. The switched-mode power converter of claim 18, further comprising an inductor coupled between the output of the half-bridge circuit and the output of the switched-mode power converter.

22. The switched-mode power converter of claim 18, further comprising an on-time timer coupled to an output of the feedback processing circuit, the on-time timer configured to produce the pulse with the on-time duration based on a value of a signal applied to an on-time duration control port.

23. The switched-mode power converter of claim 18, wherein during the soft-start phase, the on-time duration is successively increased from an initial duration to a final duration corresponding to the ramped reference signal coupled to an on-time duration control port, wherein the final duration is larger than the initial duration.

* * * * *